April 6, 1954 J. R. AMBROSE 2,674,660

ARTIFICIAL REVERBERATION

Filed Dec. 10, 1952

INVENTOR.
James R. Ambrose
BY Morris L. Rabkin
ATTORNEY

Patented Apr. 6, 1954

2,674,660

UNITED STATES PATENT OFFICE 2,674,660

ARTIFICIAL REVERBERATION

James R. Ambrose, Indianapolis, Ind., assignor to Radio Corporation of America, a corporation of Delaware Application December 10, 1952, Serial No. 325,103

5 Claims. (Cl. 179—100.2)

This invention relates to magnetic recording, and, more particularly, although not necessarily exclusively, to novel means for producing sound effects, such, for example, as artificial reverberations, by using magnetic recording techniques.

In the art of sound recording or radio broadcasting, there frequently arise situations in which special sound effects are desired. Among these sound effects is that of echoes or reverberations.

Many and varied systems have been devised in the past for artificially or synthetically creating echo effects. Included in these prior proposals are echo chambers and magnetic recording systems. The former are frequently cumbersome and bulky. Heretofore, devices of the latter type have required a separate reproducing head or signal reading gap for each reverberation or echo and have been attended by other disadvantages.

It is, accordingly, an object of the present invention to provide an improved and novel artificial reverberator using magnetic recording techniques.

It is another object of the present invention to provide an artificial reverberator wherein fewer reproduce heads may be used to produce an effect similar to that heretofore provided by a greater number of heads.

In accomplishing these and other objects there has been provided, in accordance with this invention, an artificial reverberation system in which a plurality of record heads are arranged to record substantially identical signals in separate, laterally spaced tracks along a record tape. The record heads, in addition to being laterally spaced, are also spaced longitudinally along the tape. A plurality of reproduce heads are arranged to engage the tape at successive pick-up stations along the tape. Each of the reproduce heads is adapted to engage all of the record tracks on the tape. Regeneration may also be used in practicing the invention to increase the number of echoes and decay time.

Figure 1:
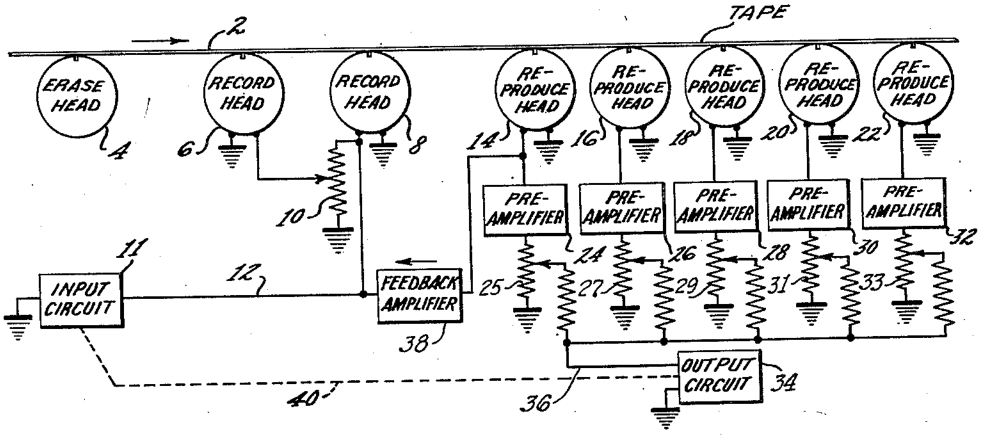
Figure 2:
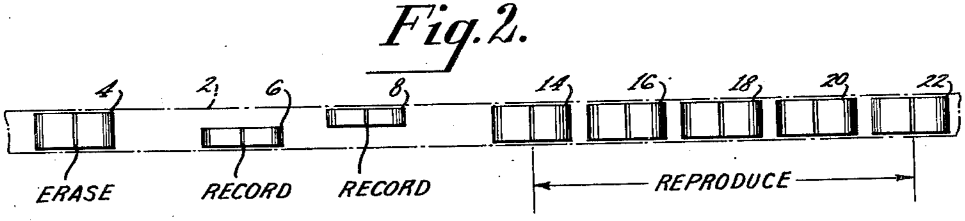

A better understanding of the present invention may be had from the following detailed description of an illustrative embodiment when read in connection with the accompanying drawing in which:

Fig. 1 is an elevational view of a schematic representation of a system embodying the present invention, and Fig. 2 is a plan view of the system shown in Fig. 1.

Referring to the drawings in more detail, there is shown a magnetic recording medium in the form of a record member or tape 2. An erase head 4 is positioned to engage the surface of the record tape to erase from the full width of the tape any previously recorded signals. It will, of course, be understood that a suitable source of erasing current (not shown) is connected to energize the erasing head.

A pair of recording heads 6 and 8 are positioned to operatively engage separate, adjacent tracks along the record member or tape 2. These heads 6 and 8 are connected together through an impedance network 10. Both heads 6 and 8 are energized from the same input circuit 11 through the lead 12. The impedance network 10 may be used to adjust the relative input to one head with respect to the other. In addition to the record heads 6 and 8 being spaced laterally with respect to the tape 2, they are also spaced longitudinally with respect to the tape. Thus, as the tape advances over the record heads, and a signal is applied from the input circuits, the signal will be recorded simultaneously in the separate adjacent channels with the signal in one channel being in advance of the signal in the other channel by an amount equal to the longitudinal spacing of the heads. It will of course be appreciated that more than two record heads may be employed if desired. If more than two record heads are used they will be operatively associated with separate, laterally spaced tracks as well as being spaced longitudinally.

A plurality of reproduce heads 14, 16, 18, 20 and 22, five of them being illustrated, are positioned to engage the tape 2 subsequent to the engagement by the record heads 6 and 8. These reproduce heads are of sufficient width to span the full width of the record member 2. Each of the reproduce heads is provided with a separate preamplifier, 24, 26, 28, 30 and 32, respectively. Each of the preamplifiers feeds into an adjustable impedance network represented by potentiometers 25, 27, 29, 31 and 33 respectively. The center taps of all of the potentiometers are connected in a circuit with a single output circuit 34 through a lead 36. It will be appreciated that the spacing between adjacent ones of the reproduce heads should be different from the spacing between adjacent ones of the record heads. Such an arrangement will assure a phase difference between the signals detected by successive ones of the reproduce heads.

Since each reproduce head engages the full width of the record member, a signal appearing in either of the tracks or channels will produce a corresponding signal in each of the reproduce heads as the signal passes those heads. Thus if the same signal were recorded in both tracks or channels, but longitudinally spaced, the signal would be detected by the first reproduce head 14 first in one channel then in the other. The same procedure would occur at each of the subsequent reproduce heads. It may, therefore, be seen that by employing only five reproduce heads, ten repetitions of the signal may be accomplished. Of course, if more than two record heads are used and they are appropriately spaced, the number of repetitions of the signal will be equal to the product of the number of record heads and the number of reproduce heads.

The impedance networks 25, 27, 29, 31, and 33, connected in the output circuit of the reproduce heads may be used to provide a progressive decrease in the reproduced signal. To further multiply the number of repetitions of the signal, the output of at least one of the reproduce heads may be fed back to the record heads through a suitable feedback amplifier 38. The amplifier 38 should include an appropriate control whereby the amplifier may be biased to cut-off when feedback is not desired. Such amplifiers are well known and are believed to require no further details.

A complete circuit for synthesizing an echo effect or reverberation should include a through path for the initial signal between the input and output circuits without going through the reverberator. Such an arrangement is represented by the broken line 40.

It may now be seen that an echo effect or artificial sound reverberation may be accomplished with the use of fewer heads than were heretofore necessary to produce a comparable effect by the use of prior art devices.

What is claimed is:

1. An artificial reverberation system of the type using a magnetic record tape, said system comprising, in combination, a plurality of magnetic recording heads, said heads being spaced laterally with respect to the tape for coaction with separate parallel tracks along said tape, said heads also being spaced longitudinally of said tape with respect to each other, and a plurality of reproducing heads spaced along said tape, each of said reproducing heads being of a width substantially equal to the record tape.

2. An artificial reverberation system of the type using a magnetic record tape, said system comprising, in combination, a plurality of magnetic recording heads, said heads being spaced laterally with respect to the tape for coaction with separate parallel tracks along said tape, said heads being also spaced longitudinally along said tape, and a plurality of reproducing heads spaced along said tape, each of said reproducing heads being of a width substantially equal to the sum of the widths of said separate tracks.

3. An artificial reverberation system of the type using a magnetic record tape, said system comprising, in combination, a plurality of recording heads, said heads being spaced laterally with respect to said tape for coaction with separate parallel tracks along said tape, said heads being also spaced longitudinally along said tape, signal input means connected to supply signals simultaneously to each of said heads, a plurality of reproducing heads spaced along said tape, each of said reproducing heads being of a width substantially equal to the sum of the widths of said separate tracks, and an output circuit connected to receive signals from all of said reproducing heads.

4. An artificial reverberation system of the type using a magnetic record tape, said system comprising, in combination, a plurality of recording heads, said heads being spaced laterally with respect to said tape for coaction with separate parallel tracks along said tape, said heads being also spaced longitudinally along said tape, signal input means connected to supply signals simultaneously to each of said heads, a plurality of reproducing heads each being of a width substantially equal to the sum of the widths of said separate tracks, and a feedback circuit connected between said reproducing heads and said recording heads.

5. An artificial reverberation system comprising, in combination, a magnetic record tape, a plurality of recording heads, said heads being spaced laterally with respect to said tape for coaction with separate parallel tracks along said tape, said heads being also spaced longitudinally along said tape, signal input means connected to supply signals simultaneously to each of said heads, a plurality of reproducing heads spaced along said tape, each of said reproducing heads being of a width substantially equal to the sum of the widths of said separate tracks, and a feedback circuit connected between said reproducing heads and said recording heads.

No references cited.